United States Patent [19]

Weirathmueller

[11] Patent Number: 5,653,570

[45] Date of Patent: Aug. 5, 1997

[54] STAIR-LIKE LOG FEEDER

[75] Inventor: Friedrich Weirathmueller, New Brunswick, Calif.

[73] Assignee: Valley Machine Works Ltd., Nackawic, Canada

[21] Appl. No.: 603,226

[22] Filed: Feb. 20, 1996

[51] Int. Cl.⁶ .................. B27B 31/00; B65G 25/08
[52] U.S. Cl. .................. 414/746.6; 74/110; 144/250.25; 198/774.3
[58] Field of Search ............ 198/774.3; 414/745.9, 414/746.1, 746.2, 746.6; 74/44, 110; 144/242 R, 242.1, 250.2, 250.25

[56] References Cited

U.S. PATENT DOCUMENTS

| | | | |
|---|---|---|---|
| 4,383,604 | 5/1983 | Grandemange | 198/775 |
| 5,086,912 | 2/1992 | Howden, Jr. | 198/776 |
| 5,174,351 | 12/1992 | Lindenblatt et al. | 414/746.4 X |
| 5,257,688 | 11/1993 | Fridlund | 198/443 |
| 5,351,729 | 10/1994 | Brisson | 144/242 R |
| 5,374,157 | 12/1994 | Allard | 414/746.6 |
| 5,423,417 | 6/1995 | Redekop | 198/774.2 |

FOREIGN PATENT DOCUMENTS

| | | | |
|---|---|---|---|
| 1277682 | 12/1990 | Canada | 201/1 |
| 2146456 | 4/1994 | Canada . | |
| 1256509 | 12/1971 | United Kingdom . | |

*Primary Examiner*—Karen B. Merritt
*Assistant Examiner*—Janice L. Krizek
*Attorney, Agent, or Firm*—Mario D. Theriault

[57] ABSTRACT

A stair-like log feeder having a movable drive module and a movable driven unit cooperating with one another for unscrambling logs from a pile of logs and for moving the singularized logs upwardly along an inclined plane in a successive series of displacements. The log feeder comprises a support frame having support rollers for slidably supporting the drive module and the drive unit. A cyclic actuator is connected to the drive module by a link arm, for moving the drive module in an alternating up and down movement along the inclined plane. A first pair of rack gears is affixed to the drive module, and a second pair of rack gears is affixed to the driven unit. A pair of gears is mounted on a transverse shaft which is pivotally affixed to the support frame. The pair of gears is engaged with the first and second rack gears for supporting both the drive module and the driven unit in a pendulum mode about the transverse shaft, and for converting a movement of the drive module into an equal, opposite and concurrent displacement of the driven unit. Each step of the drive module has a riser portion forming an angle of between about 3° and about 6° with the inclined plane. Similarly each notch of the driven unit has a longitudinal edge forming an angle of between about 5° and about 8° with the inclined plane.

20 Claims, 7 Drawing Sheets

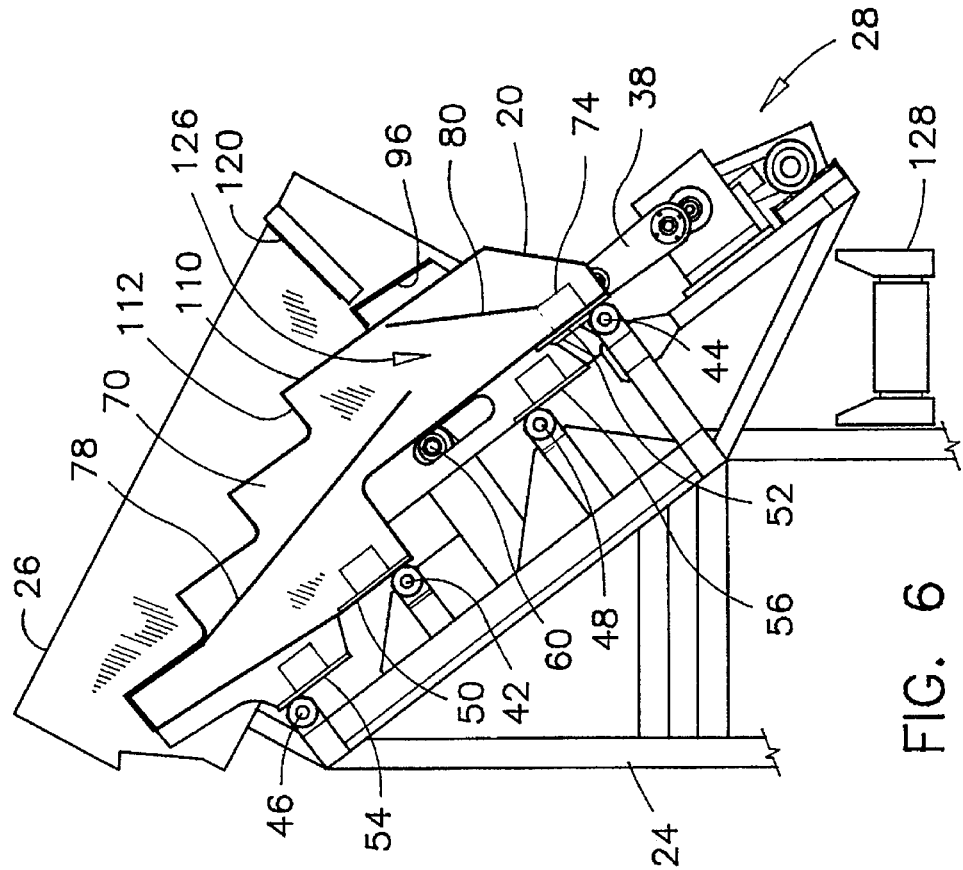
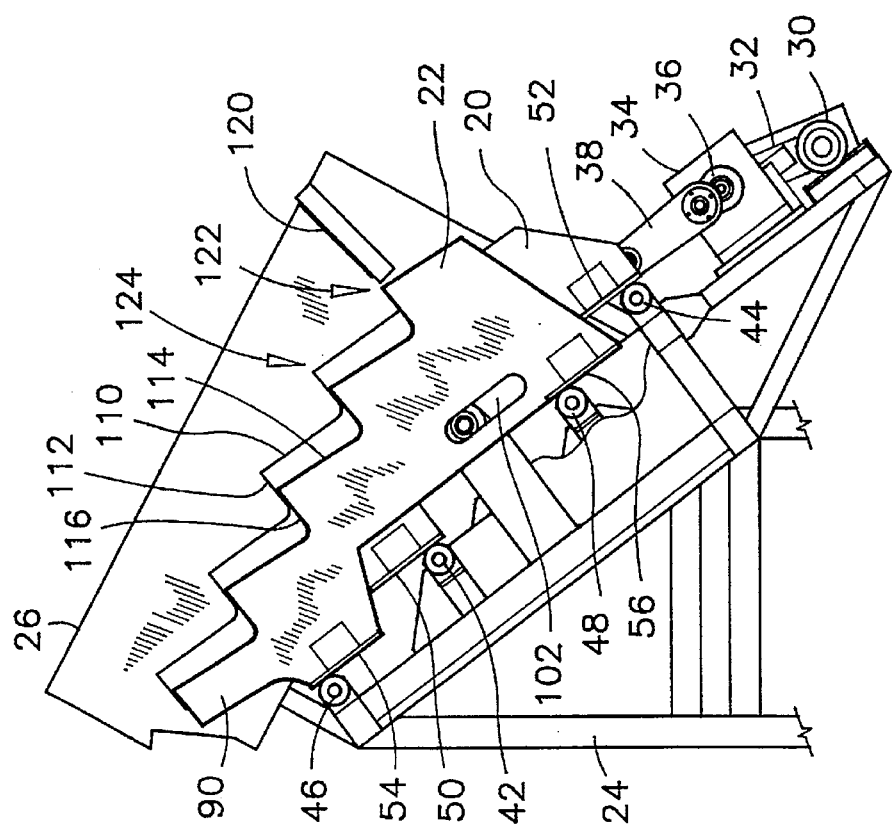
FIG. 6
FIG. 5

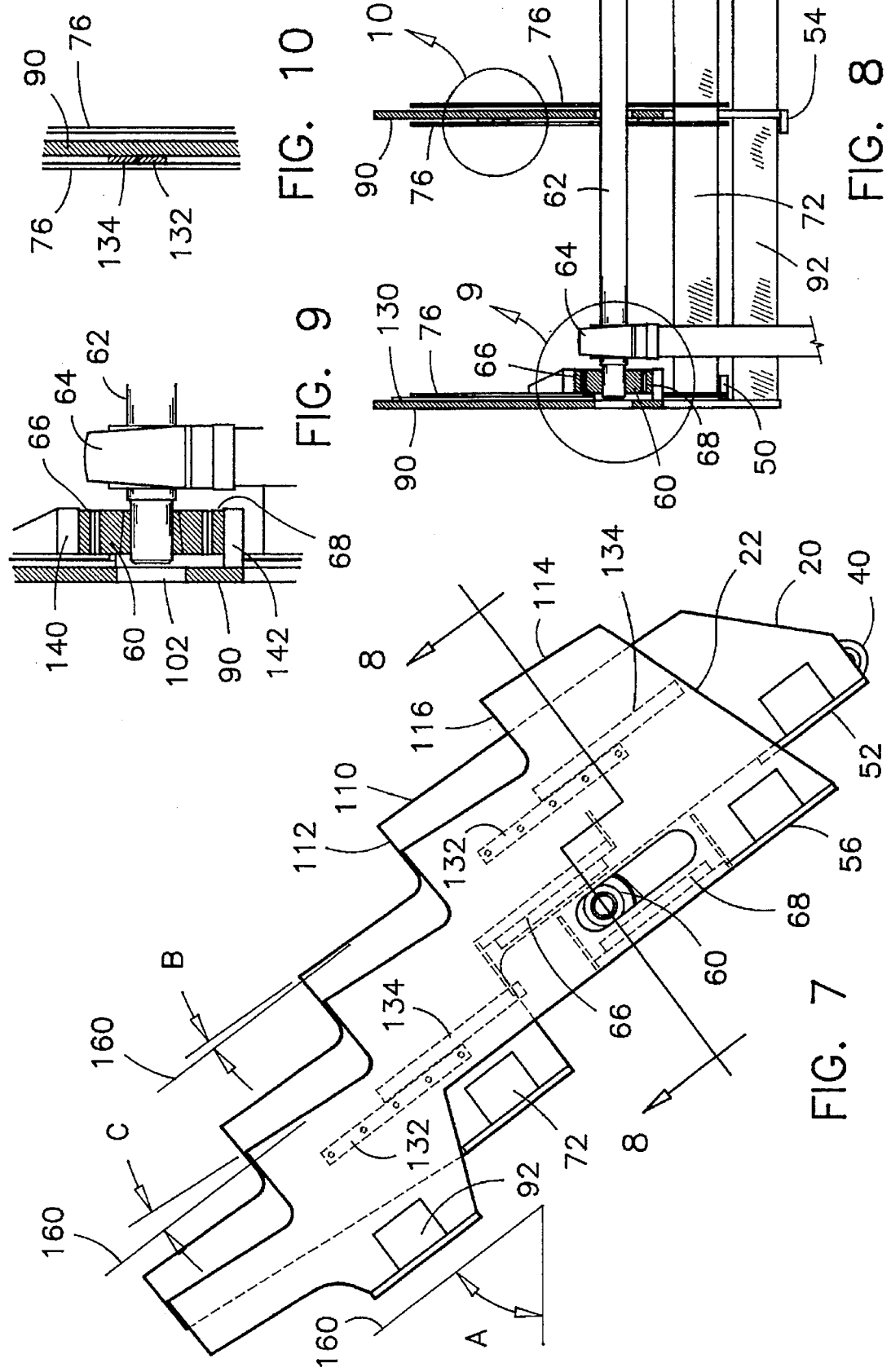

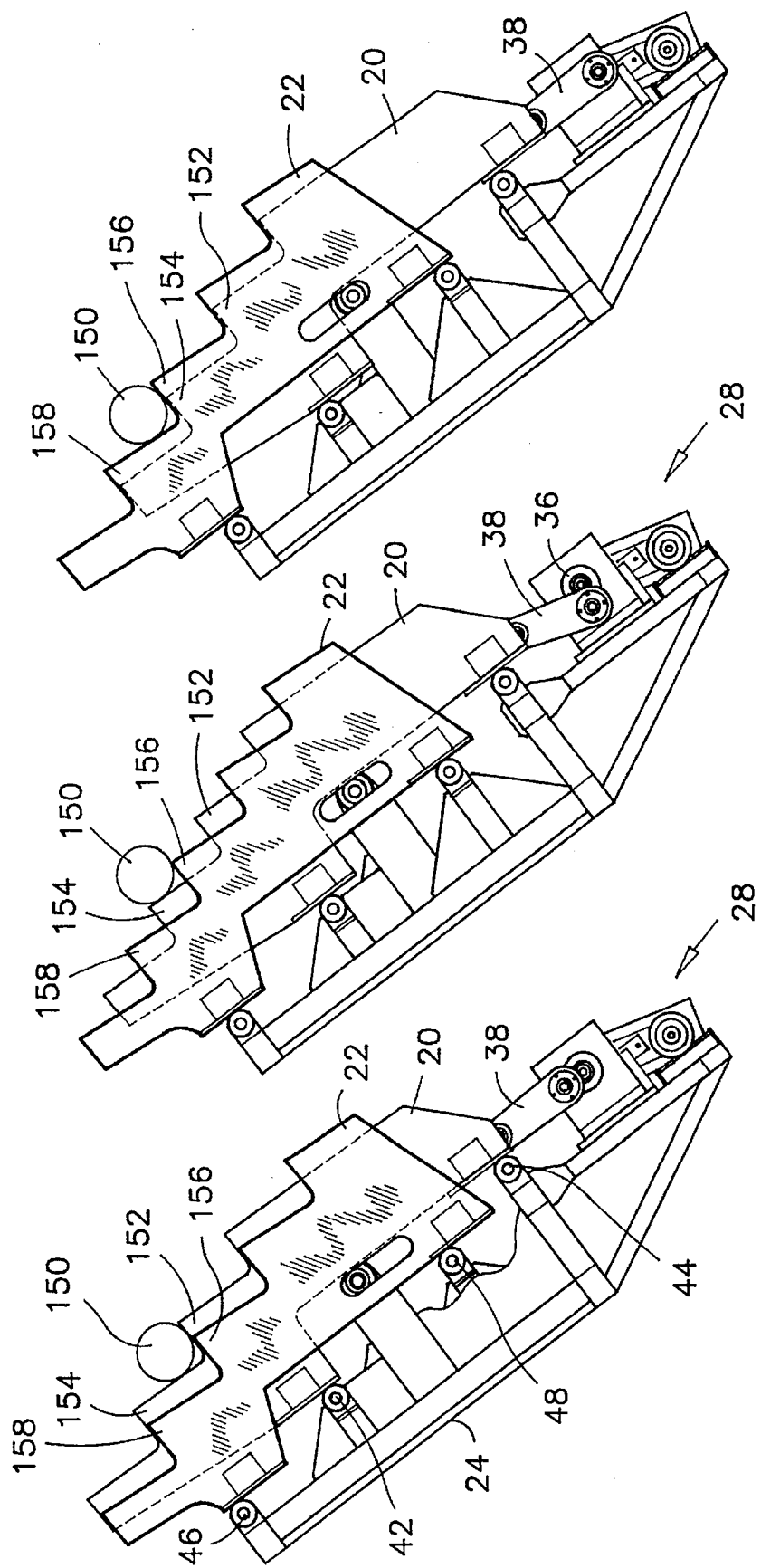

STAIR-LIKE LOG FEEDER

FIELD OF THE INVENTION

The present invention relates to an apparatus to unscramble logs from a pile of logs and to individually feed those logs into a sequential end-to-end stream of logs into a sawmill infeed conveyor. More particularly, the present invention relates to an apparatus having reciprocally movable stair-like structures for moving singularized logs laterally along an inclined plane.

BACKGROUND OF THE INVENTION

In a sawmill operation, logs are normally received by trucks and unloaded by grapple or fork type loaders capable of handling large bundles of logs at one time. These bundles are placed on live decks or into feed chutes where the logs are unscrambled and singularized for further sawmill processing.

In areas where forests have been harvested for several generations, the logs are generally relatively small. Therefore in these regions, the log unscrambling and feeding apparatus must be capable of operating at high speed so that a sawmill can maintain a competitive production of lumber.

Various efforts have been made in the past to develop machinery for unscrambling and feeding logs into a sawmill using stair-like feeders. In a first example, Canadian Patent 1,277,682 issued on Dec. 11, 1990 to Interlog AB describes a first type of stair-like feeder for feeding logs. This machine comprises a feeding arrangement having a plurality of steps and being movable reciprocally along a rising support path also having a plurality of steps. A log supported on the feeding arrangement is successively pushed upwardly from one step to the next step of the support path upon forward movement of the feeding arrangement.

The particularity of this invention i.e. that the movement path of the feeding arrangement is substantially rectilinear and parallel to the riser portion of each of the support path steps, and that the steps formed by the juxtaposition of the feeding arrangement and the support path project approximately equally.

In another example, U.S. Pat. No. 5,257,688 issued on Nov. 2, 1993 also to Interlog AB, describes another apparatus having a feeding arrangement being movable reciprocally along a rising support path. The particularity of this invention is that upon movement of the feeding arrangement, a riser portion of each step on the feeding arrangement and on the support path are mutually displaced a measure smaller than the length of a thread portion of each step, and that the riser portion of each step is angled more steeply than the linear movement of the feeding arrangement.

In a further example, U.S. Pat. No. 5,351,729 issued on Oct. 4, 1994 to Les Ateliers Benoit Allard Inc. illustrates another step-like feeder where the movement of the feeding arrangement follows a reciprocating trajectory corresponding to an arc of a circle.

In the apparatus of the preceding examples, each log is moved upwardly during the forward movement of the feeding arrangement only. Each log is held stationary while the feeding arrangement returns down to start a new upward cycle. Thus each log is displaced upwardly following an intermittent movement, where the idle sector of the feeding cycle is equal to the effective sector. Such a stop-and-go movement represents a first limitation of that type of apparatus for feeding relatively small logs at a fast rate.

A second limitation of this type of apparatus is that a relatively large drive system is required to overcome the forces and inertia required to alternately push and pull the feeding arrangement with the logs thereon.

Another type of stair-like feeder is described in the Canadian Patent Application numbered 2,146,456, filed in Canada on Oct. 6, 1993 by TAHKA OY. In this application, there is illustrated a feed apparatus comprising rectangular box-like step members guided at the ends thereof and bearably carried one on top of the other, with the uppermost step being supported by a fixed wall.

In this apparatus, the first and all subsequent odd-numbered steps are joined to one-another and connected to a first throw of a crank shaft. The second and all subsequent even-numbered steps are also joined to one-another and connected to a second throw of a crank-shaft. The first and second stepped units are moved rectilinearly to-and-fro in opposite directions at the same speed. Hence, a log on this machine is moved upwardly during the forward stroke of the first stepped unit. The log is transferred to a step of the second stepped unit and is moved upwardly again by this second stepped unit during the retraction of the first stepped unit.

In a sawmill environment it is preferable to have a log feeder which is structurally sturdy, operating smoothly without sudden stresses, and where bark and splinters may not cause jamming or excessive wear on the parts. Furthermore, it is preferable to have a log feeder having features to prevent bridging of small logs in the infeed chute thereof. In these regards, the apparatus of the prior art may not always be appropriate.

SUMMARY OF THE INVENTION

In the present invention, however, there is provided a stair-like log feeder having a movable drive module and a movable driven unit cooperating with one-another for unscrambling logs from a pile of logs and for moving the singularized logs along an inclined plane in a successive series of displacements.

In accordance to one aspect of the present invention, the log feeder comprises a support frame having slide means and a reciprocal reactive drive means mounted thereon, and a cyclic actuator attached thereto. There is also provided a drive module having at least one ladder segment and guide plates on a lower side thereof cooperating with the slide means for slidably supporting and guiding this drive module along the inclined plane. The ladder segment has two spaced-apart profiled side plates each having first, second and subsequent steps leading toward an upper end of the inclined plane.

The stair-like log feeder of this first aspect of the present invention also has a driven unit comprising at least two longitudinal stringboard members spaced apart in a lateral and parallel alignment to one-another, and having on a lower side thereof sole plates cooperating with the slide means for slidably supporting and guiding this driven unit along the inclined plane. Each stringboard member has first, second and subsequent notches leading towards the upper end of the inclined plane.

The cyclic actuator is connected to the drive module by a link arm, for moving the drive module in an alternating up and down movement along the inclined plane. The reciprocal reactive drive means is interconnected between the drive module and the driven unit for converting a movement of the drive module into an equal, opposite and concurrent displacement of the driven unit.

The ladder segment of the drive module is interlaid between the two stringboard members of the driven unit such that during a relative movement of the ladder segment and the stringboard members along the inclined plane, a profile of each notch, when viewed perpendicularly to a plane of the stringboard member, intersects a profile of one of the steps, and a profile of each of the steps when viewed perpendicularly to the plane of the profiled plate, intersects a profile of one of the notches.

Hence, upon an upward movement of the drive module along the inclined plane, the singularized log in a first step of the drive module is pushed upwardly by that first step along the inclined plane until it reaches the second notch. Similarly, upon a downward movement of the drive module along the inclined plane, the singularized log is pushed upwardly by the second notch of the driven unit along the inclined plane until it reaches the second step of the drive module. Accordingly, a second cycle of the cyclic actuator causes the singularized log to move along the inclined plane and into a subsequent step of the drive module.

A first advantage of this aspect of the log feeder of this invention is that the reciprocal reactive drive means supports both the drive module and the driven unit in a pendulum mode, such that the weight of the drive module counterbalances the weight of the driven unit. The log feeder is thereby energy efficient where the cyclic actuator operates under minimum stresses. The log feeder thus built is also compatible to those applications where high feed rate and minimum vibration are preferred.

In accordance with another aspect of the present invention, the reciprocal reactive drive means of the log feeder comprises a first rack gear affixed to the drive module, and a second rack gear affixed to the driven unit, and a gear pivotally affixed to the support frame. The gear has a first segment engaged to the first rack gear, and a second segment, opposite the first segment thereof, engaged to the second rack gear.

This arrangement of a log feeder having a reciprocal reactive drive means made of gears and rack gears provides an operation having minimum backlash, and a construction which is easy to maintain and sturdy enough to resist a continuous tumbling of logs on its log carrying surface.

In accordance with yet another aspect of the present invention, a major portion of the drive module and of the driven unit are enclosed by an inlet log chute. In this further aspect of the log feeder of the present invention, each step of the drive module has a riser portion leading to a tread portion thereof, and each riser portion forms an angle of between about 3° and about 6° with the inclined plane. Similarly each notch of the driven unit has a longitudinal edge leading to a transversal edge thereof, and each longitudinal edge forms an angle of between about 5° and about 8° with the inclined plane.

Numerous advantages are derived from these inclinations of the riser portions and of the longitudinal edges. Firstly, a pile of log in the inlet chute is shook upwardly at every downward stroke of either the drive module or the driven unit. This action prevents a bridging of small logs in the inlet chute. Other advantages include enhancing a grabbing of logs by the driven unit during a lowermost portion of its travel, while preventing a double feeding of logs in any one step or notch.

BRIEF DESCRIPTION OF THE DRAWINGS

The preferred embodiment of the invention will be further understood from the following description, with reference to the drawings in which:

FIG. 5 is a cross-section view of the log feeder along line 5—5 of FIG. 1.

FIG. 6 is a cross-section view of the log feeder along line 6—6 of FIG. 1.

FIG. 7 is a side view of the drive module and of the driven unit illustrating the rack gears and guide strips in dash lines.

FIG. 8 is a cross section of the shaft and gear assembly, along line 8—8 of FIG. 7.

FIG. 9 is an enlarged view of Detail 9 of FIG. 8.

FIG. 10 is an enlarged view of Detail 10 of FIG. 8.

FIG. 11 is a side view of the log feeder where the drive module is in an uppermost position and the driven unit is in a lowermost position.

FIG. 12 is a side view of the log feeder where both the drive module and the driven unit are in an intermediate position.

FIG. 13 is a side view of the log feeder where the drive module is in a lowermost position and the driven unit is in an uppermost position.

DETAILED DESCRIPTION OF THE PREFERRED EMBODIMENT

Figure 1:
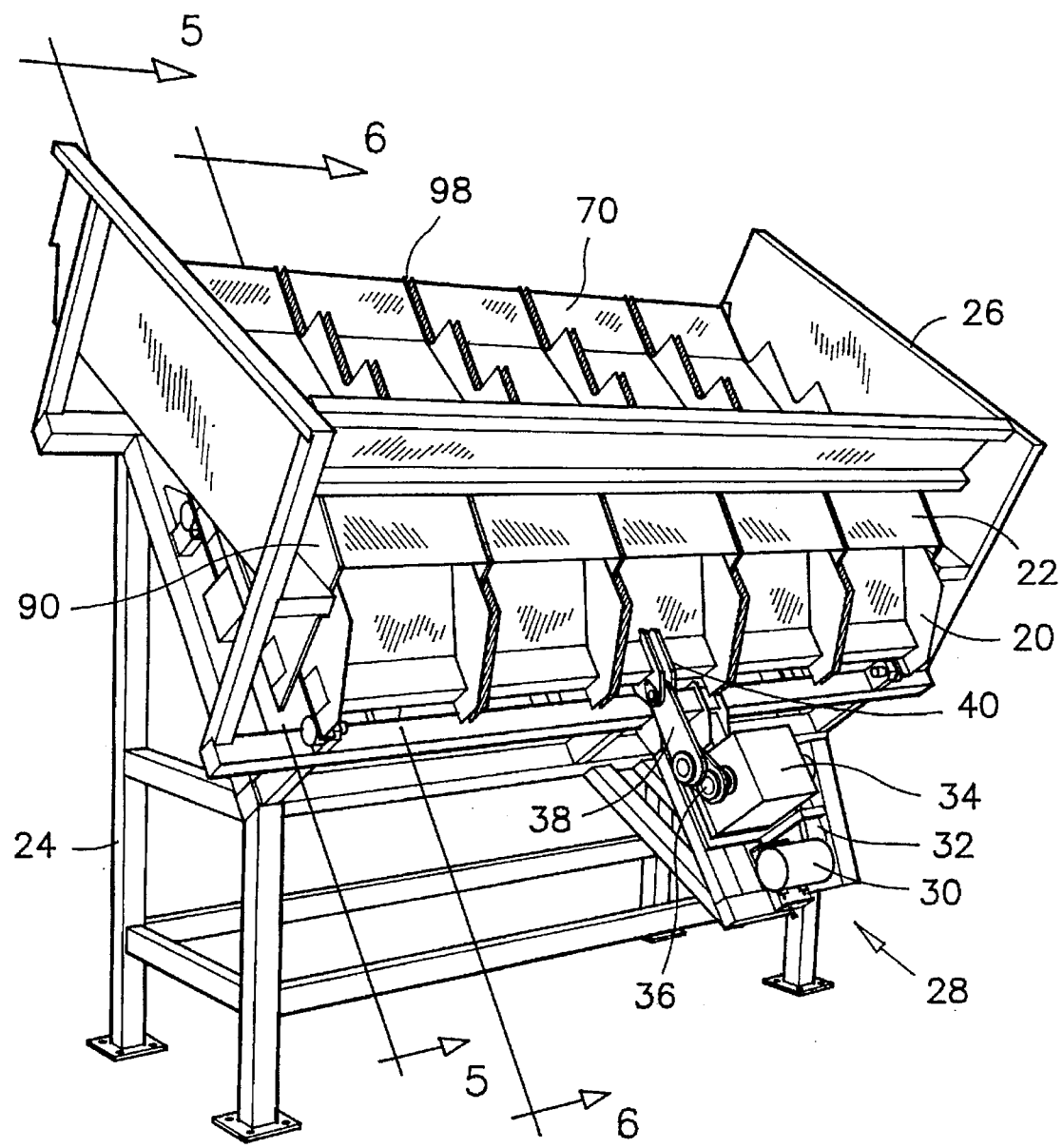
FIG. 1 is a perspective front and side view of the stair-like log feeder of the preferred embodiment.
Figure 2:
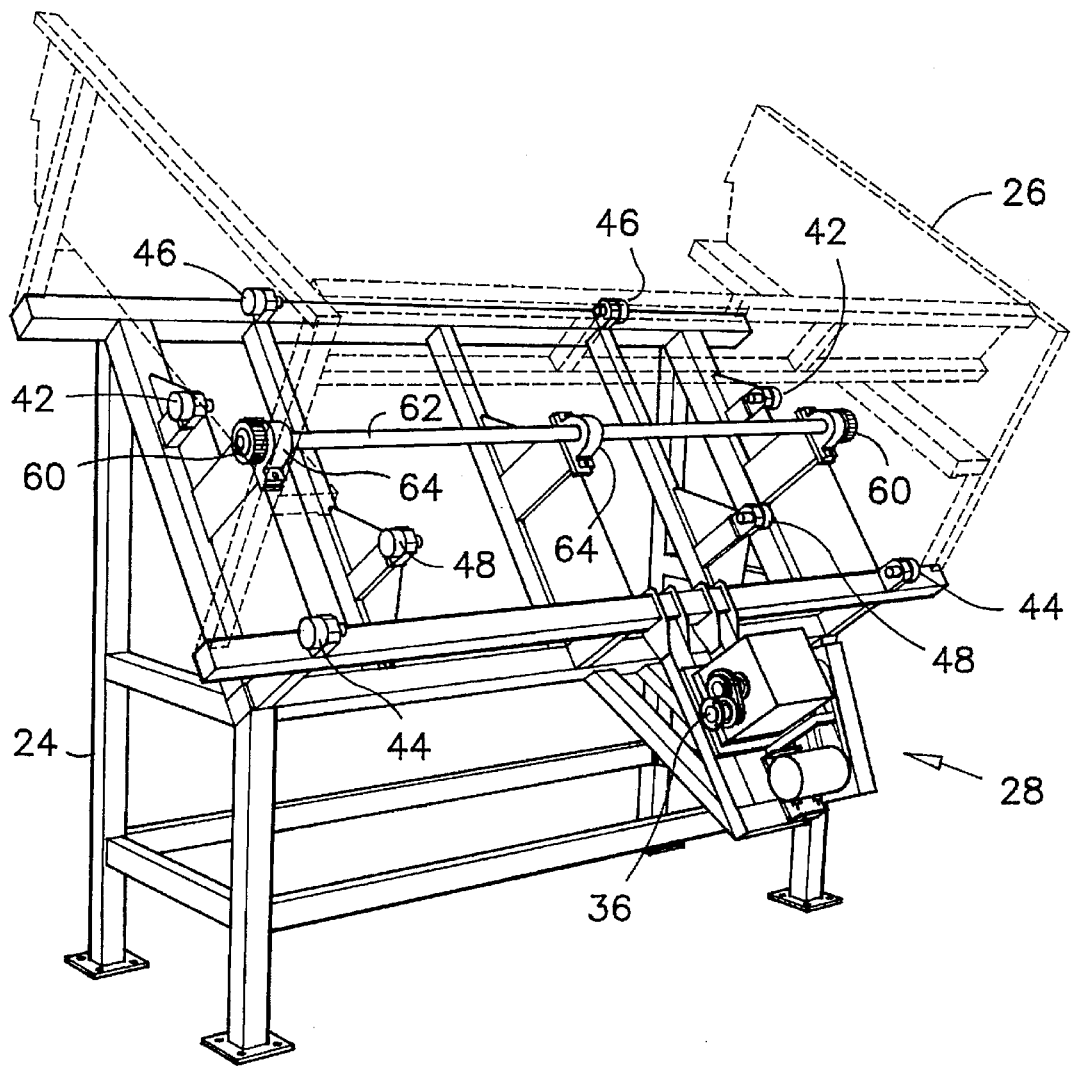
FIG. 2 is a perspective front and side view of the frame of the log feeder of the preferred embodiment, where the chute portion of the frame is shown in dash lines to provide a better illustration of the rolling elements thereof.

Referring to FIGS. 1 to 4, there is illustrated a stair-like feeder for logs of a preferred embodiment, having a drive module 20 and a driven unit 22, being both movable along an inclined plane of a frame assembly 24 and being partly enclosed by a log infeed chute 26.

The drive module 20 is actuated up and down along an inclined plane by a cyclic actuator assembly 28. Numerous types of cyclic actuator assemblies are known to the persons knowledgeable in the art of power transmission, and would be feasible for this application. However, where feeding logs at a high rate is desired, a preferred cyclic actuator assembly 28 comprises an electric motor 30, a power transmission belt 32, and a gear reducer 34 having a crank arm 36 on its output shaft. The crank arm 36 is connected to the drive module 20 by means of a link arm 38. The link arm 38 is preferably connected at a first end to the crank arm 36, and into a clevis bracket 40 on the drive module 20 by means of anti-friction bearing articulations. This type of connection ensures that the operation of the cyclic actuator assembly 28 is smooth and durable.

Both the drive module 20 and the driven unit 22 are mounted in a slidable manner on the frame assembly 24. Two pairs of outside rollers 42,44 on the frame assembly 24 support the drive module 20 in an inclined orientation. Similarly, two pairs of inside rollers 46,48 support the driven unit 22 in a similar inclined orientation. The drive module 20 has two front guide plates 50 cooperating with the upper outside rollers 42, and two rear guide plates 52 cooperating with the outside lower rollers 44. The driven unit 22 has two forward sole plates 54, one of which is partly seen on FIG.

3, cooperating with the inside upper rollers 46 and two rearward sole plates 56 cooperating with the inside lower rollers 48.

The drive module 20 and the driven unit 22 are movably held over the frame assembly 24 and urged in opposite up and down directions to one-another by means of a reciprocal reactive drive means. Several reciprocal drive mechanisms are known in the art and may be used for this application. For example, chains and sprockets, cables and sheaves or pivoted linkages may be selected by some manufacturers.

However, a preferred reciprocal reactive drive means for this preferred embodiment of the present invention comprises a pair of gears 60 mounted on a shaft 62 which is pivotally supported to the frame assembly 24 by two or more pillow block bearings 64. An upper segment of each gear 60 interacts with one of a pair of drive rack gears 66 on the drive module 20. Likewise, a lower segment of each of gears 60 interacts with one of a pair of driven rack gears 68 on the driven unit 22. One of the driven rack gears 68 is partly illustrated on FIG. 3, while both rack gears 66,68 are better explained when making reference particularly to FIGS. 7, 8 and 9.

Both gears 60 and the rack gears 66,68 interconnect the drive module 20 to the driven unit 22 for a controlled movement therebetween. A push-pull action of link arm 38 on clevis 40 under a rotation of crank arm 36, causes the drive module 20 and the driven unit 22 to alternately move back and forth an equal stroke but in opposite direction from one-another.

The drive module 20 is made of a plurality of ladder segments 70 spaced apart on a front transverse beam 72 and on a rear transverse beam 74. Each ladder segment is made of two profiled side plates 76 enclosing a first planar deflector 78 and a second planar deflector 80.

The driven unit 22 is made of a plurality of stringboard members 90 spaced apart on a forward transverse beam 92 and a rearward transverse beam 94. The stringboard members 90 are spaced apart a distance slightly larger than a width of a ladder segment 70. A third planar deflector 96 between the highest region of two adjacent stringboard members 90 is used to maintain a parallel alignment between each stringboard member 90. The plurality of stringboard members 90 is one more in number than the plurality of ladder segments 70.

The ladder segments 70 are spaced apart a gap 98 which is dimensioned to receive therein one stringboard member 90. In operation, each ladder segment 70 of the drive unit 20 is interlaid between two stringboard members 90 of the driven unit 22 as shown on FIG. 1.

A slot 102 is provided in each stringboard member 90 to mount shaft 62 into the pillow block bearings 64, and to allow each stringboard member 90 to move upwardly and downwardly relative to shaft 62.

Referring now specifically to FIG. 5, there is illustrated a side view of the drive module 20 interlaid into the driven unit 22. The profiled side plates 76 of the drive module 20 have a series of steps on the higher edges thereof. Each step is formed of a riser portion 110 leading upwardly to a tread portion 112.

Similarly, the stringboard member 90 has a series of notches, each notch being formed by a longitudinal edge 114 leading upwardly to a transversal edge 116. The dimensions of a riser portion 110 and of a longitudinal edge 114 are substantially the same, and the dimensions of a tread portion 112 and of a transversal edge 116 are also substantially the same. Concurrently with the above dimensions, the throw of the crank arm 36 is about one quarter a length of a riser portion 110 of the drive module 20. Hence, a total displacement of the crank arm 36 during half a rotation is about one half a length of a riser portion 110.

The number of notches in the series of notches of the stringboard members 90 is one more in number than the series of steps of the profiled side plates 76. The primary reason for this being that the lowermost notches 122 of stringboard members 90 project above the lowermost riser portions 110 of the drive module 20, such that the third planar deflector 96 may be installed between each stringboard member 90 to stiffen all stringboard members 90 against lateral deflection.

In operation, a first lowermost notch 122 projects above a riser portion 110 of the first lowermost step 124 a distance perpendicular to the direction of movement of the drive module 20, similar to a projection of the first step 124 above the longitudinal edge 114 of a second notch. Accordingly, all notches have a projection over a riser portion 110 beneath or ahead of it, a length of about half a transversal edge 116, and all steps have a projection over a longitudinal edge 114 beneath or ahead of it, a length of about half a tread portion 112.

The log feeder of the preferred embodiment preferably comprises a log chute 26 having a transversal lower portion 120 aligned with a lower position of the lowermost steps 122 of the driven unit 22. This transversal lower portion 120 cooperates with the lowermost step 122 for grabbing and pushing one log from under a pile of logs in this chute 26 at every time the driven unit returns to a lowermost position. Subsequent upward feeding of the singularized logs will be explained later when making reference to FIGS. 11, 12 and 13.

Referring now specifically to FIG. 6, there is illustrated a cross section view through a ladder segment 70 of the drive module 20. The first planar deflector 78 covers a space between two profiled side plates 76, from the uppermost step thereof to a region below the lower step. The second planar deflector 80 covers a space between two profiled side plates 76, from the rear transverse beam 74 to a region above the lower end of the first planar deflector 78. An opening 126 between the lower end of the first planar deflector 78 and the upper end of the second planar deflector 80 allows bark, splinters and other debris common to log handling operations, to fall through the frame assembly 24, and into an optional waste conveyor 128 located under the cyclic actuator assembly 28.

For those installations of the log feeder of the preferred embodiment where peeled logs are exclusively handled, the first planar deflector 78 should follow closely a contour of each step on the profiled side plates 76.

Figure 3:
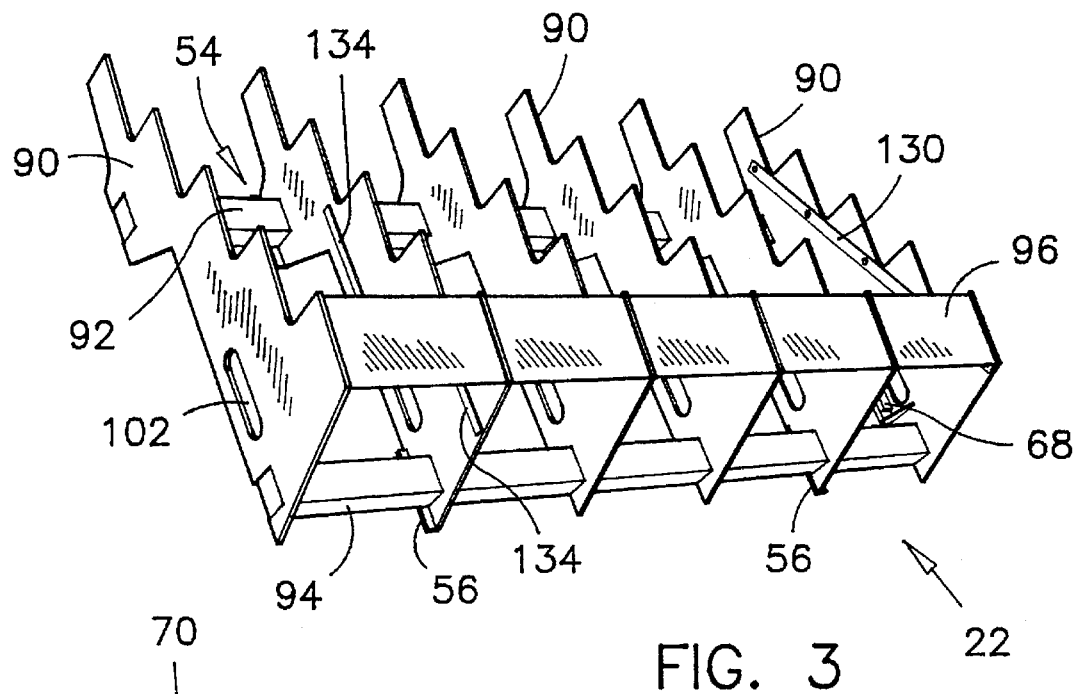
FIG. 3 is a perspective front and side view of the driven unit of the log feeder.
Figure 4:
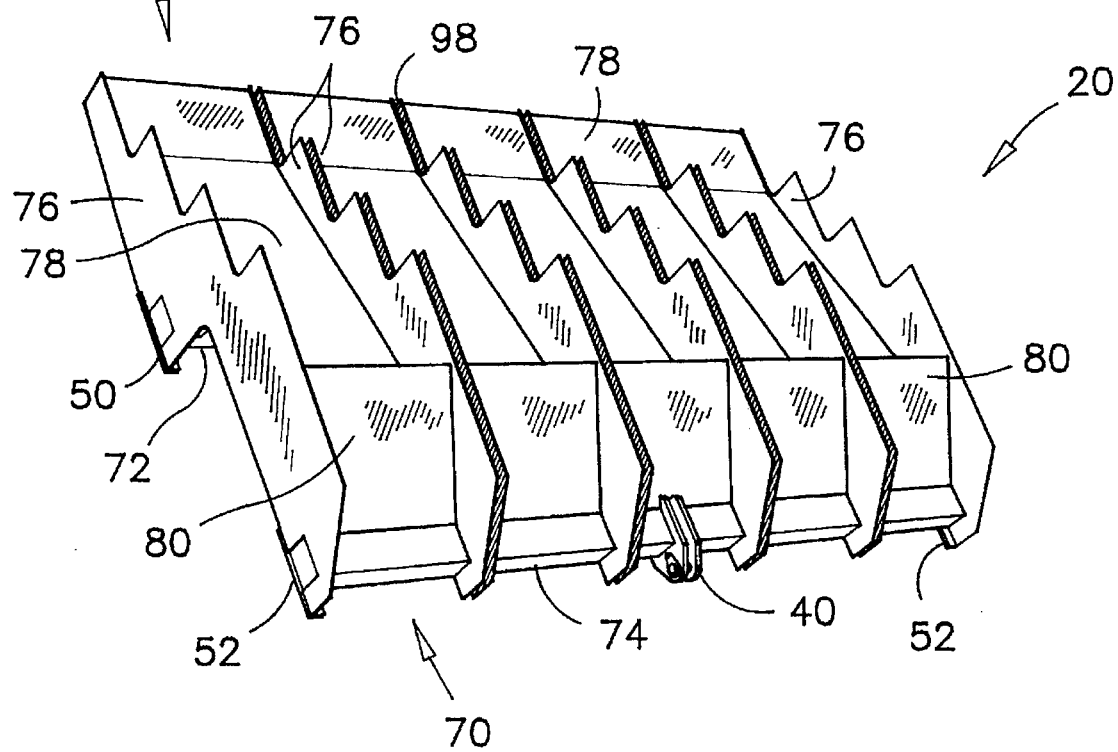
FIG. 4 is a perspective front and side view of the drive module of the log feeder.

The drive module 20 is held in lateral alignment with the driven unit 22 by means of a spacer strip 130 between each of the outermost stringboard members 90 and the outside profiled side plates 76 of the outermost ladder segment 70. One of these spacer strips 130 is illustrated in FIG. 3 while the other one is illustrated in FIG. 8. The spacer strips 130 are preferably made of a wear resistant material.

The combination of the drive module 20 and of the driven unit 22 is held in a lateral alignment relative to the frame assembly 24 by both gears 60 being confined inside the outermost profiled side plates 76, as illustrated in FIGS. 8 and 9.

The drive module 20 and the driven unit 22 are kept within an inclined longitudinal alignment by means of the rollers 42,44,46,48 acting on a lower side thereof, and by two pairs of lower guide strips 132 on the drive module 20 cooperating with two pairs of upper guide strips 134 on the driven unit 22. The upper guide strips 134 are partly illustrated in FIG. 3, while a pair of lower guide strips 132 and a pair of upper guide strips 134 are illustrated in dash lines in FIG. 7.

Referring now specifically to FIGS. 7 to 10, a drive rack gear 66 is affixed to the inner side of the outermost profiled side plates 76 of the drive unit 20. Similarly, a driven rack gear 68 is affixed inside the outermost stringboard members 90 of the driven unit 22. Concurrently with the aforesaid statement, a perpendicular spacing between each drive rack gear 66 and each driven rack gear 68 is maintained in a first direction by rollers 42,44,46,48, and in a second direction by cooperating guide strips 132,134. These guide strips 132, 134 are preferably made of a wear resistant material.

Each rack gear 66 is attached to a profiled plate 76 by means of screws (not shown) into an upper backing bracket 140 on the inside surface of profiled side plate 76. Similarly, rack gear 68 is attached to stringboard member 90 by means of screws (not shown) into a lower backing bracket 142 on the inner side of the outermost string board member 90. Both pairs of rack gears 66,68 and the gears 60 are accessible from under the machine, to effect periodic lubrication or for replacement when worn.

A preferred mounting of the gears 60 onto the shaft 62 is by means of a taper-lock bushing (not shown) which is small enough in diameter to enable an installation thereof through slot 102 of the outermost stringboard members 90. Such a mounting means is not illustrated here for being common in the trade of machine design.

In operation, the drive module 20 and the driven unit 22 move up and down along an inclined plane defined by the support rollers 42,44,46,48, as illustrated on FIGS. 11, 12 and 13. When the crank arm 36 rotates, the link arm 38 and the drive module 20 move from an uppermost position as shown in FIG. 11 to an intermediate position illustrated in FIG. 12, and to a lowermost position as shown in FIG. 13. When the drive module 20 reaches an uppermost position, a log 150 held against step 152 of drive module 20, for example, moves past an underlaid notch 156 of the driven unit 22. When the driven unit 22 moves upwardly upon a return stroke of the drive module 20, the log 150 is pushed upwardly by notch 156 along a riser portion of step 154 of the drive module 20, until that log moves past that step 154. During another half a turn of crank arm 36, the log is pushed by step 154 over an upper notch 158 of the driven unit 22. Hence, the log is moved relative to the frame assembly 24, a distance of a riser portion 110, or of a longitudinal edge 114, for every full rotation of the crank arm 36.

In this preferred embodiment of the present invention, the thickness of a stringboard member 90 is preferably twice as much as the thickness of one profiled side plate 76. The number of springboard members 90 being one more than the number of ladder segments 70, the weight of this additional stringboard member 90 plus the weight of all planar deflectors 96 should approximate the combined weight of the planar deflectors 78,80 of the drive module 20. The reason for this being to ensure that a difference in weight between the drive module 20 and the driven unit 22 is minimal.

The cyclic actuator assembly 28 causes the forward movement of the log 150 to effect a sinusoidal movement comprising a smooth acceleration over half the forward stroke, followed immediately by a smooth deceleration over the second half of this forward stroke. Therefore, the log feeder of this preferred embodiment is not subject to sudden stresses.

Moreover, the movements of the drive module 20 counterbalances the weight and inertia of the driven unit 22, and vice-versa, such that the absolute weight to be displaced by the cyclic actuator assembly 28 is relatively small as compared to equipment of the prior art using a single acting stair-like member. In fact, the weight to be displaced is the difference in weight of the drive module 20 and the driven unit 22 plus the weight of the logs being fed upwardly. For an ideally balanced operation, additional weight may be added inside the transversal beams 74,94 to obtain an equal weight for both the drive module 20 and the driven unit 22.

The primary advantage of the relatively smooth and effortless operation of this preferred embodiment is that a large feed rate may be obtained with a relatively small cyclic actuator assembly 28. It is believed that a feed rate of about 50 to 60 logs per minute is possible with a log feeder of this preferred embodiment.

Referring now back to FIG. 7, a recommended plane of incline 160 for this preferred embodiment forms an angle with a horizontal line of between about 45° and 65° and preferably about 55° as indicated as label "A". The preferred orientation of a riser portion 110 of a step on the drive module 20 is between 3° and about 6° from a plane of incline 160, as indicated by label "B".

The reason for angle "B" being to move a pile of logs in a perpendicular direction to the plane of incline 160 at every downward stroke of the drive module 20. This perpendicular movement prevents the bridging of small logs inside the log chute 26.

When large bundles of logs are fed at once in the log chute 26, especially if these logs are relatively small, the logs can sometimes become entangled, blocking the flow of logs in the inlet chute 26. Such conditions are undesirable for causing downtime to the sawmill.

The raised riser portion 110 of each step of the drive module 20 shakes the logs of the inlet chute upwardly thereby loosening any bridging formed in that chute 26. The raised riser portion 110 of the steps of the drive module 20 has the additional advantage of enhancing a better alignment of logs against the surface of either the drive module 20 or the driven unit 22.

Similarly, the preferred orientation of the longitudinal edges 114 between the notches of the driven unit 22 is between about 5° to about 8° from the plane of incline 160, as indicated by label "C". The reason for this angle is firstly to prevent bridging of small logs as previously explained for angle "B". A second reason for this steeper angle "C" is to ensure that once per cycle a log is positively engaged into one of the notches. An upward larger push under the pile of logs in the inlet chute 26 from the raised longitudinal edge 114 ensures that each notch of the driven unit 22 carries one log when leaving from a lowermost position.

Another advantage of angled risers 110 and angled longitudinal edges 114 is that a relative projection of each step over a cooperating notch, or of each notch over a cooperating step decreases as the logs are pushed upwardly along the inclined plane 160. This feature has been found advantageous for preventing a double feeding of logs in any one step or notch.

Figure 14:
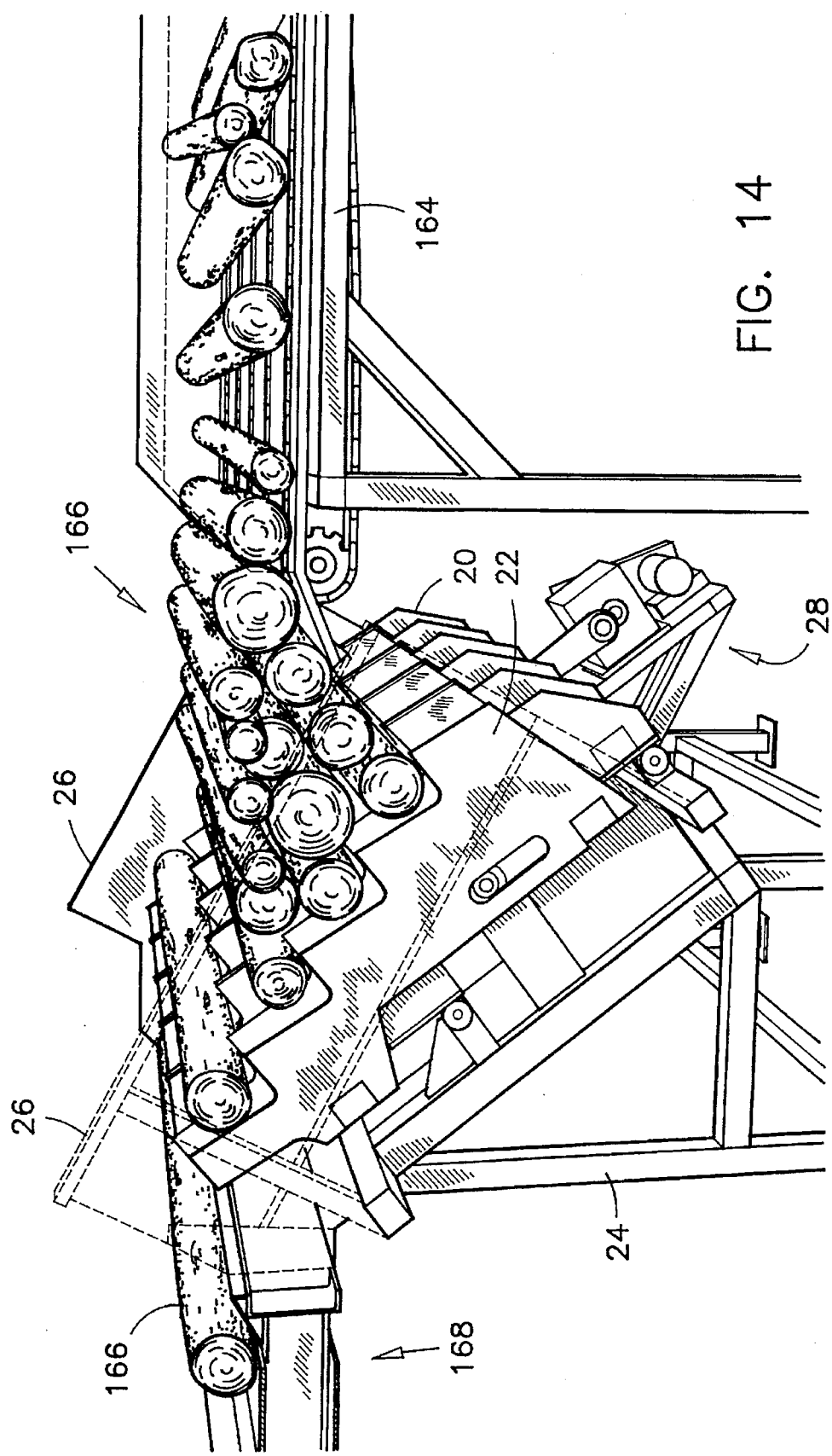
FIG. 14 is a side and top perspective view of a preferred installation of the log feeder of the preferred embodiment.

A preferred installation of the step feeder of the preferred embodiment is illustrated in FIG. 14. A preferred installation comprises a log deck 164 on which logs may be fed in bundles. Logs 166 may be fed in the inlet chute 26 to fill a major portion of the chute completely. During their ascending movement, the logs are carried by either the drive module 20 or by the driven unit 22, until being discharged into a sawmill infeed conveyor 168 adjacent an uppermost position of a last step of the drive module 20.

The construction of the log feeder of the preferred embodiment using a plurality of plates standing on their edges and being retained by transversal beams, provides a structure which is relatively easy to fabricate. Most importantly, it provides a structure which is sturdy and resistant to the continuous shock loading from the logs tumbling in the inlet chute 26.

The log feeder of the preferred embodiment as described and illustrated herein is energy efficient, highly productive and compatible with stressful sawmill environments.

While the above description provides a full and complete disclosure of the preferred embodiment of this invention, various modifications, alternate constructions, and equivalents may be employed without departing from the true spirit and scope of the invention. Such changes might involve alternate materials, components, structural arrangements, sizes, operational features or the like. Therefore the above description and illustrations should not be construed as limiting the scope of the invention which is defined by the appended claims.

I claim:

1. A stair-like log feeder for unscrambling logs from a pile of logs and for moving singularized logs along an incline in a successive series of displacements, said log feeder comprising:

a support frame having slide means and a reciprocal reactive drive means mounted thereon, and a cyclic actuator attached thereto;

a drive module comprising at least one ladder segment having guide means on a lower side thereof cooperating with said slide means for slidably supporting and guiding said drive module along said incline;

said at least one ladder segment having two spaced apart profiled side plates having each a first, second and subsequent steps leading toward an upper end of said incline;

a driven unit comprising at least two longitudinal stringboard members spaced apart in a lateral and parallel alignment to one-another, and having on a lower side thereof sole plate means cooperating with said slide means for slidably supporting and guiding said driven unit along said incline;

each stringboard member having a first, second and subsequent notches leading towards said upper end of said incline;

said cyclic actuator being connected to said drive module by a link means, for moving said drive module in an alternating up and down movement along said incline;

said reciprocal reactive drive means being interconnected between said drive module and said driven unit for converting a movement of said drive module into an equal, opposite and concurrent displacement of said driven unit;

said ladder segment of said drive module being interlaid between said at least two stringboard members of said driven unit such that during a relative movement of said at least one ladder segment and said at least two stringboard members along said incline, a profile of one of said notches, when viewed perpendicularly to a plane of said stringboard member, intersects a profile of one of said steps, and a profile of one of said steps when viewed perpendicularly to a plane of said profiled side plate, intersects a profile of one of said notches;

whereby upon an upward movement of said drive module along said incline, a singularized log in said first step of said drive module is pushed upwardly by said first step along said incline until reaching said second notch; and whereupon a downward movement of said drive module along said incline, said singularized log is pushed upwardly by said second notch of said driven unit along said incline until reaching said second step of said drive module; and whereby a second cycle of said cyclic drive means causes said singularized log to move along said incline and into said subsequent step.

2. A stair-like log feeder as claimed in claim 1, wherein said reciprocal reactive drive means comprises:

a first power transmission element affixed to said drive module, a second power transmission element affixed to said driven unit, and a third power transmission element pivotally affixed to said support frame, said third power transmission element having a first segment connected to said first power transmission element, and a second segment, opposite said first segment relative to an axis of rotation of said third power transmission element, connected to said second power transmission element.

3. A stair-like log feeder as claimed in claim 2 wherein said first and second power transmission elements are a first and a second rack gear respectively, and wherein said third power transmission element is a gear engageable with said first and second rack gears.

4. A stair-like log feeder as claimed in claim 1 wherein said slide means is a first set of rollers cooperating with said guide plate means, and a second set of rollers cooperating with said sole plate means.

5. A stair-like log feeder as claimed in claim 1 wherein, a major portion of said drive module and of said driven unit are enclosed by an inlet log chute, and wherein each said step has a riser portion leading to a tread portion thereof, and said riser portion forms an angle of between about 3° and about 6° with a plane of said incline.

6. A stair-like log feeder as claimed in claim 5 wherein each notch has a longitudinal edge leading to a transversal edge thereof, and said longitudinal edge forms an angle of between about 5° and about 8° with a plane of said incline.

7. A stair-like log feeder as claimed in claim 1 wherein the weight of said drive module is approximately equal to the weight of said driven unit whereby said cyclic actuator operates under minimum stresses.

8. A stair-like log feeder for unscrambling logs from a pile of logs and for moving singularized logs along an incline in a successive series of displacements, said log feeder comprising:

a support frame having a first set of roller means, a second set of roller means and a reciprocal reactive drive means mounted thereon, and a cyclic actuator attached thereto;

a drive module comprising a plurality of ladder segments mounted in a lateral and parallel alignment to one-another on a first pair of transverse beams, said first pair of transverse beams having guide plates on a lower side thereof cooperating with said first set of roller means for slidably supporting and guiding said drive module along said incline;

each said ladder segment having two spaced apart profiled side plates and deflecting surfaces therebetween, each profiled side plate having a first, second and subsequent steps leading toward an upper end of said incline, each step having a riser portion leading to a tread portion thereof;

a driven unit comprising a plurality of stringboard members spaced apart in a lateral and parallel alignment to one-another on a second pair of transverse beams, said second pair of transverse beams having sole plates under a lower side thereof cooperating with said second set of roller means for slidably supporting and guiding said driven unit along said incline;

each stringboard member having a first, second and subsequent notches leading towards said upper end of said incline, each notch having a longitudinal edge leading to a transversal edge thereof, each notch being similar in shape to each said step of said drive module;

said cyclic actuator being connected to said drive module by a link means, for moving said drive module in an alternating up and down movement along said incline;

said reciprocal reactive drive means being connected to both said drive module and said driven unit, for converting a movement of said drive module into an equal, opposite and concurrent displacement of said driven unit;

each said ladder segment of said drive module being interlaid between two adjacent said stringboard members of said driven unit such that a projection of said first notch of said stringboard member over said riser portion of said first step of said ladder segment in a direction perpendicular to said incline, is similar to a projection of said first step over said longitudinal edge of said second notch;

whereby upon an upward movement of said drive module along said incline, said singularized log against said tread portion of said first step of said drive module is pushed upwardly along said longitudinal edge of said second notch of the driven unit until said singularized log is beyond said transversal edge of said second notch; and whereby upon a downward movement of the drive module along said incline, said singularized log is pushed upwardly by said transversal edge of said second notch of the driven unit along a riser portion of said second step of said driven module until said singularized log is beyond said tread portion of said second step of said drive module; and whereby a second cycle of said cyclic actuator causes said singularized log to move along said incline beyond said tread portion of said subsequent step.

9. A stair-like log feeder as claimed in claim 8, wherein said reciprocal reactive drive means comprises a first rack gear affixed to said drive module, a second rack gear affixed to said driven unit and a gear pivotally affixed to said support frame, and being engageable with both said first and said second rack gears.

10. A stair-like log feeder as claimed in claim 9 wherein said drive module comprises a first set of longitudinal guide means, and said driven unit comprises a second set of longitudinal guide means interacting with said first set of longitudinal guide means for keeping said first rack gear at a constant perpendicular distance from said second rack gear during a relative longitudinal movement between said drive module and said driven unit.

11. A stair-like log feeder as claimed in claim 8, wherein said cyclic actuator comprises an electric motor, a gear reducer, a power transmission belt between a drive shaft of said motor and an input shaft of said gear reducer, and a crank arm connected to an output shaft of said reducer.

12. A stair-like log feeder as claimed in claim 11, wherein a throw of said crank arm is about a quarter of a length of said riser portion.

13. A stair-like log feeder as claimed in claim 11, wherein said crank arm is connected at a first end thereof to said output shaft of said reducer, and at a second end thereof to said drive module by means of anti-friction bearing articulations.

14. A stair-like log feeder as claimed in claim 8 comprising also a waste conveyor for carrying away bark and other debris normally associated with a manipulation of logs, and wherein said deflecting surfaces are a first deflector covering a front portion of said ladder segment and a second deflector covering a rear portion of said ladder segment, said first deflector and said second deflector forming a gap therebetween being substantially vertically in line with said waste conveyor, for letting said bark and debris fall into said waste conveyor.

15. A stair-like log feeder as claimed in claim 8 wherein a plane of said incline forms an angle of between about 45° and about 65° with a horizontal line.

16. A stair-like log feeder as claimed in claim 15 wherein said riser portion of said step forms an angle of between about 3° and about 6° with a plane of said incline.

17. A stair-like log feeder as claimed in claim 15 wherein said longitudinal edge of said notch forms an angle of between about 5° and about 8° with a plane of said incline.

18. A reciprocal reactive drive mechanism for actuating a first and a second stair-like portion of a log feeder into opposite displacement to one-another;

said log feeder comprising an inclined support frame having slide means mounted thereon, and a cyclic actuator attached thereto;

said first and second stair-like portions having guide means on a lower side thereof cooperating with said slide means for being slidably supported and guided along said inclined support frame;

said cyclic actuator being connected to said first stair-like portion by a link means, for moving said first stair-like portion in an alternating up and down movement along said inclined support frame;

said reciprocal reactive drive mechanism comprising:

a first power transmission element affixed to said first stair-like portion, a second power transmission element affixed to said second stair-like portion and a third power transmission element pivotally affixed to said inclined support frame, said third power transmission element having a first segment connected to said first power transmission element, and a second segment, opposite said first segment relative to an axis of rotation of the third power transmission element, connected to said second power transmission element, whereby a movement of said first stair-like portion along said inclined support frame is converted into an equal, opposite and concurrent displacement of said second stair-like portion.

19. A reciprocal reactive drive mechanism as claimed in claim 18 wherein said first and second power transmission elements are a first and a second rack gear respectively, and wherein said third power transmission element is a gear engageable with said first and second rack gears.

20. A reciprocal reactive drive mechanism as claimed in claim 19 wherein said first stair-like portion comprises a first set of longitudinal guide means, and said second stair-like portion comprises a second set of longitudinal guide means interacting with said first set of longitudinal guide means for keeping said first rack gear at a constant perpendicular distance from said second rack gear during a relative longitudinal movement between said first and said second stair-like portions of said log feeder.

\* \* \* \* \*